(12) United States Patent
Zhang et al.

(10) Patent No.: US 8,270,483 B1
(45) Date of Patent: Sep. 18, 2012

(54) METHOD AND APPARATUS FOR APPLYING ACCURATE PARAMETER ESTIMATION AND EFFICIENT FADE DETECTION IN WEIGHTED PREDICTION FOR VIDEO COMPRESSION

(75) Inventors: Rui Zhang, Pleasanton, CA (US); Guy Cote, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 1153 days.

(21) Appl. No.: 12/126,057

(22) Filed: May 23, 2008

Related U.S. Application Data

(60) Provisional application No. 61/022,051, filed on Jan. 18, 2008.

(51) Int. Cl.
*H04N 7/26* (2006.01)
(52) U.S. Cl. ............ 375/240.12; 375/240.1; 375/240.13
(58) Field of Classification Search .................. 348/235, 348/236, 238, 687; 375/240.12, 240.13
See application file for complete search history.

(56) References Cited

U.S. PATENT DOCUMENTS

| | | | | |
|---|---|---|---|---|
| 5,734,419 A * | 3/1998 | Botsford et al. | ................ | 348/97 |
| 6,057,893 A * | 5/2000 | Kojima et al. | ................ | 348/700 |
| 6,115,076 A * | 9/2000 | Linzer | ............................ | 348/578 |
| 6,323,914 B1 * | 11/2001 | Linzer | ............................ | 348/578 |
| 7,308,145 B2 * | 12/2007 | Abe et al. | ....................... | 382/233 |
| 7,430,333 B2 * | 9/2008 | Yu et al. | ......................... | 382/254 |
| 7,733,380 B1 * | 6/2010 | Cote et al. | .................. | 348/222.1 |
| 7,991,224 B2 * | 8/2011 | Andrew et al. | ................ | 382/164 |
| 8,004,538 B2 * | 8/2011 | Alessi et al. | ................... | 345/591 |
| 8,040,558 B2 * | 10/2011 | Dosluoglu | ...................... | 358/1.9 |
| 2006/0088210 A1 * | 4/2006 | Yu et al. | ......................... | 382/167 |
| 2006/0239509 A1 * | 10/2006 | Saito | ............................. | 382/104 |
| 2008/0123945 A1 * | 5/2008 | Andrew et al. | ................ | 382/164 |
| 2008/0130031 A1 * | 6/2008 | Dosluoglu | ...................... | 358/1.9 |
| 2008/0198927 A1 * | 8/2008 | Wu | .......................... | 375/240.12 |
| 2009/0262800 A1 * | 10/2009 | Zhang et al. | ............... | 375/240.2 |

OTHER PUBLICATIONS

Alattar, Adnan, M., et al., "Detecting Fade Regions in Uncompressed Video Sequences", 1997 IEEE, pp. 3025-3028.
Qian, Zueming, et al., "Effective Fades and Flashlight Detection Based on Accumulating Histogram Difference", IEEE Transactions on Circuits and Systems for Video Technology, vol. 16, No. 10, Oct. 2006, pp. 1245-1258.
Boyce, Jill M., "Weighted Prediction in the h.264/MPEG AVC Video Coding Standard", 2004 IEEE, pp. III-798 through III-792.
Yin, Peng, et al., "Localized Weighted Prediction for Video Coding", 2005 IEEE, pp. 4365-4368.
"Calculation of Average PSNR Differences Between RD-Curves", ITU—Telecommunications Standardization Sector, Study Group 16 Question 6, Mar. 26, 2001, pp. 1-4.

* cited by examiner

*Primary Examiner* — Hassan Kizou
*Assistant Examiner* — Emmanuel Maglo
(74) *Attorney, Agent, or Firm* — North Weber & Baugh LLP

(57) ABSTRACT

A method to control weighted prediction for video compression. The method comprises (A) generating statistics based upon analysis of a plurality of video frames, (B) detecting a fade condition based upon the statistics, (C) generating one or more estimated weighted prediction parameters based upon the statistics when the fade condition is detected and (D) encoding the plurality of video frames. The encoding takes into account the estimated weighted prediction parameters when generated.

20 Claims, 3 Drawing Sheets

US 8,270,483 B1

METHOD AND APPARATUS FOR APPLYING ACCURATE PARAMETER ESTIMATION AND EFFICIENT FADE DETECTION IN WEIGHTED PREDICTION FOR VIDEO COMPRESSION

This application claims the benefit of U.S. Provisional Application No. 61/022,051, filed Jan. 18, 2008 and is hereby incorporated by reference in its entirety.

FIELD OF THE INVENTION

The present invention relates to video processing generally and, more particularly, to a method and/or architecture for applying accurate parameter estimation and efficient fade detection in weighted prediction for video compression.

BACKGROUND OF THE INVENTION

Motion compensation is used in video compression to achieve compression efficiency. A current picture is predicted from a reference picture, and only the difference between the current picture and the prediction is encoded. The higher the correlation between the prediction picture and the current picture, the higher the compression efficiency. However, in some video sequences, particularly fading sequences, the current picture is more strongly correlated to the reference picture scaled by a weighting factor than to the reference picture itself.

Weighted prediction (WP) is a useful tool when the current picture is more strongly correlated to the reference picture scaled by a weighting factor than to the reference picture itself. Modern video coding standards, such as H.264, have adopted weighted prediction to improve coding efficiency in certain conditions. However, conventional techniques rely on a relatively long window of pictures to observe enough statistics for accurate fade detection. Such methods require the availability of the statistics for the entire fade duration, which introduces long delays that are impractical in a real-time encoding system. Also, conventional parameter estimation methods are only empirical, not mathematically correct.

SUMMARY OF THE INVENTION

The present invention concerns a method to control weighted prediction for video compression. The method comprises (A) generating statistics based upon analysis of a plurality of video frames, (B) detecting a fade condition based upon the statistics, (C) generating one or more estimated weighted prediction parameters based upon the statistics when the fade condition is detected and (D) encoding the plurality of video frames. The encoding takes into account the estimated weighted prediction parameters when generated.

The objects, features and advantages of the present invention include providing a method and/or architecture for applying accurate parameter estimation and efficient fade detection in weighted prediction for video compression that may (i) detect fade in a very short window; (ii) provide mathematically correct parameter estimation; (iii) estimate parameters and detect fade using video statistics in a small time period; (iv) provide fade detection and parameter estimation with little or no delay, (v) involve simple calculations and/or (vi) have low storage demands.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Application of weighted prediction in a coding system may be divided into two tasks: 1) detecting the fading scenes and 2) estimating the weighted prediction parameters. In a real-time coding system, it is desirable to accomplish both tasks with little or no delay, using simple calculations and low storage demand. The present invention generally provides a method and/or architecture for accurate weighted prediction (WP) parameter estimation and efficient fade detection, based upon an examination of video statistics in a small time period. The present invention may avoid extra encoding delay when a picture sequence includes bi-directional predicted pictures (e.g., B-pictures), which is often the case in the modern encoding system. The present invention may achieve a very low delay when the picture sequence includes only uni-directional prediction pictures (e.g., P-pictures). The present invention may generate, in one example, weighted prediction parameters comprising a weighting (or multiplicative) factor and an additive offset as adopted by modern video coding standards (e.g., H.264).

Figure 1:
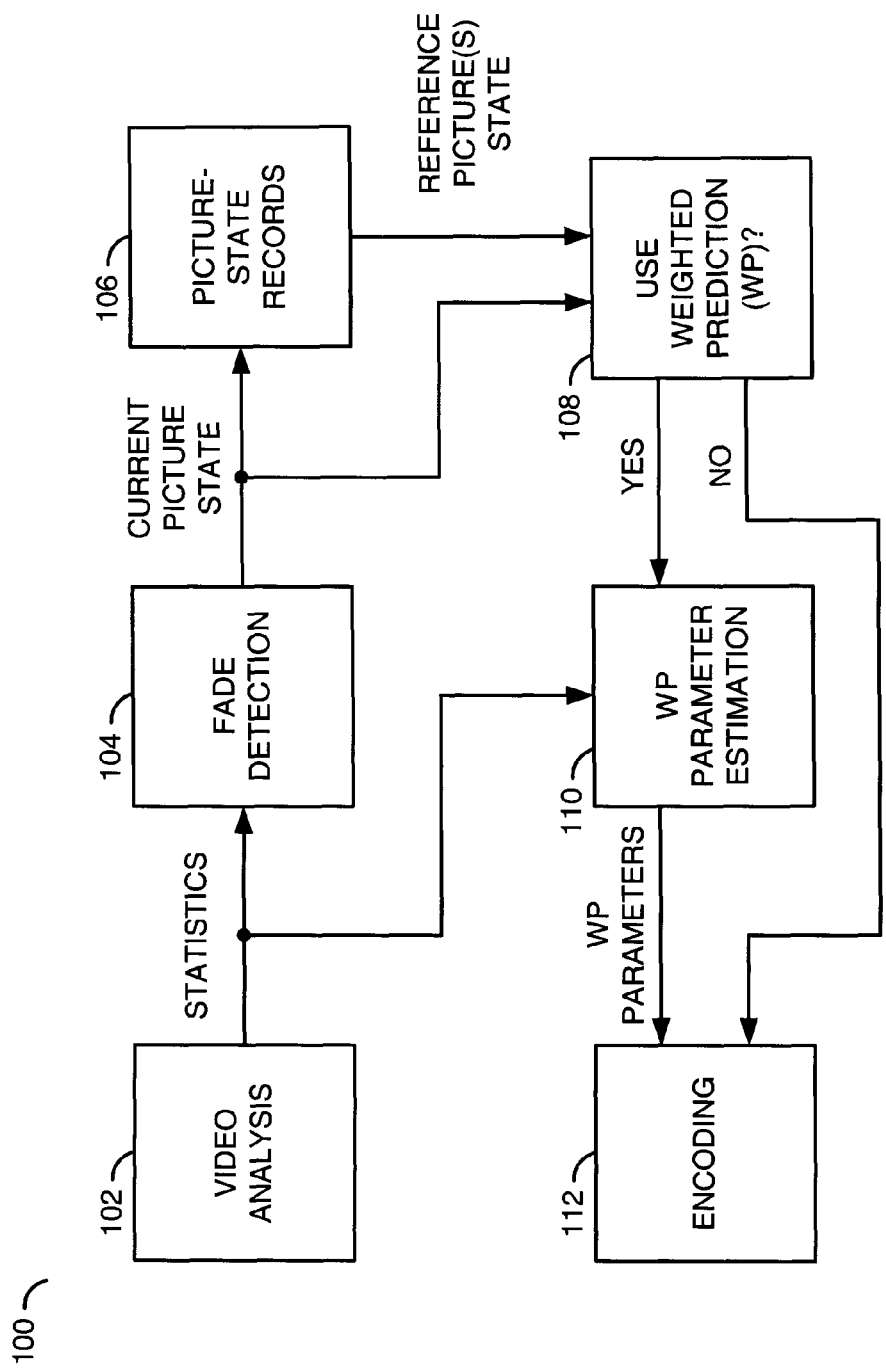
FIG. 1 is a flow diagram illustrating a weighted prediction workflow in accordance with the present invention.

Referring to FIG. 1, a diagram is shown illustrating a process 100 of applying weighted prediction in a real-time encoding system in accordance with the present invention. The process 100 may comprise a stage (or process) 102, a stage (or process) 104, a stage (or process) 106, a stage (or process) 108, a stage (or process) 110 and a stage (or process) 112. The process 102 may be implemented as a video analysis process. The process 104 may be implemented as a fade detection process. The process 106 may be implemented as a picture-state records updating step. The process 108 may be implemented as a weighted prediction decision stage. The process 110 may be implemented as a parameter estimation stage. The process 112 may be implemented as an encoding stage.

The process 100 generally begins in the stage 102. In the stage 102, statistics may be generated through video analysis of a sequence of pictures including a current picture. The statistics generated may be passed to the stage 104 and the stage 110. In the stage 104, the statistics within a small window (e.g., from several previous pictures until the current picture) may be examined to detect a fade condition of the current picture. Based upon whether or not the fade condition is detected, a state of the current picture may be set to either a first value (e.g., NORMAL) representative of no fade condition detected or a second value (e.g., FADE) representative of a fade condition having been detected. The state of the current picture may be passed to the stage 106. In the stage 106, the process 100 updates picture-state records to indicate the state of the current picture. The process 100 may then move to the stage 108.

In stage 108, the process 100 generally compares the state of the current picture and the state of one or more reference pictures associated with the current picture. The process 100 generally uses a result of the comparison to determine whether weighted prediction should be used. For example, when the current picture or one of the associated reference pictures has a state of FADE, weighted prediction may be selected for the respective current picture-reference picture pair and the process 100 may move to the stage 110 (e.g., the YES path). When the current picture and the respective reference pictures have a state of NORMAL, the process 100 may decide not to use weighted prediction and move from the stage 108 to the stage 112 (e.g., the NO path). In general, weighted prediction may be performed for each reference picture in the prediction list, when the state of the reference picture or the state of the current picture is FADE.

In the stage 110, the process 100 may look at statistics generated in the stage 102 for the current picture and the corresponding reference picture to estimate the weighted prediction parameters. The estimated weighted prediction parameters are passed to the encoding engine. When weighted prediction parameters have been estimated and passed on to the encoding engine, the process 100 may move to the stage 112. In the stage 112, the process 100 encodes the current picture. When a fade condition has been detected, the current picture is encoded using the weighted prediction parameters estimated in the stage 110. When a fade condition is not detected, the current picture is encoded without using weighted prediction.

The concept of fading scenes may be described by the following general mathematical model. In one example, the pixel value at a position (i,j) in a frame t in one original sequence f may be denoted as f(t,i,j), and the pixel value at the position (i,j) in the frame t in another original sequence g may be denoted as g(t,i,j). A linear combination of the two sequences within one particular period T may be represented by the following Equation 1:

$$F(t,i,j)=\mathrm{alpha}(t)f(t,i,j)+\mathrm{beta}(t)g(t,i,j) \qquad \text{Eq. 1}$$

where alpha(t) and beta(t) are weighting factors and alpha(t)+beta(t)=1. When g is a solid color, and the weighting factor alpha(t) is increasing, the fade may be referred to as a fade in of f. When g is a solid color, and the weighting factor alpha(t) is decreasing, the fade may be referred to as a fade out of f. Otherwise, the fade may be referred to as a cross-fade between f and g.

A weighted prediction model based on the fade model above may be described as follows. For weighted uni-prediction, a relationship between a current value (e.g., F(t,i,j)) and a previous value (e.g., F(t−1,i,j)) of the linear combination F may be represented by the following Equation 2:

$$F(t,i,j)=w(t)F(t-1,m,n)+o(t), \qquad \text{Eq. 2}$$

where w(t) is the weighting (or multiplicative) factor and o(t) is the additive offset factor. Combining Equations 1 and 2 gives the following Equation 3:

$$F(t,i,j)=(\mathrm{alpha}(t)/\mathrm{alpha}(t-1))f(t-1,m,n)+[\mathrm{beta}(t,i,j)-(\mathrm{alpha}(t)/\mathrm{alpha}(t-1))\mathrm{beta}(t-1)g(t-1,m,n). \qquad \text{Eq. 3}$$

When g is a solid color (e.g., C) with values that are the same regardless of time and location, the weighted prediction model may be matched exactly with the following Equations 4 and 5:

$$w(t)=(\mathrm{alpha}(t)/\mathrm{alpha}(t-1)) \qquad \text{Eq. 4}$$

$$o(t)=[\mathrm{beta}(t)-(\mathrm{alpha}(t)/\mathrm{alpha}(t-1))\mathrm{beta}(t-1)]C \qquad \text{Eq. 5}$$

In general, alpha(t), beta(t) and C are unknown to the encoding engine. Since alpha(t), beta(t) and C are unknown to the encoding engine, w(t) and o(t) are generally estimated based upon observations of the fading scene.

A weighted prediction parameter estimation process in accordance with the present invention may be described using the above relationships. Taking the signals f and g to be ergodic, the mean of the original sequence f may be represented by the following Equation 6:

$$m_f(t)=\mathrm{mean}(f(t))=m \qquad \text{Eq. 6}$$

and the variance of the original sequence f may be represented by the following Equation 7:

$$\mathrm{delta}_f^2=\mathrm{variance}(f(t))=\mathrm{delta}^2. \qquad \text{Eq. 7}$$

The mean and variance of the combined signal F may be represented by the following Equations 8 and 9:

$$M(t)=\mathrm{mean}(F(t)) \qquad \text{Eq. 8}$$

$$\mathrm{delta}_F^2(t)=\mathrm{variance}(F(t)) \qquad \text{Eq. 9}$$

Using Equations 1, 6 and 7, Equations 8 and 9 may be rewritten as follows:

$$M(t)=\mathrm{alpha}(t)m+(1-\mathrm{alpha}(t))C$$

$$M(t-1)=\mathrm{alpha}(t-1)m+(1-\mathrm{alpha}(t-1))C$$

$$\mathrm{delta}_F^2(t)=\mathrm{alpha}^2(t)\mathrm{delta}_f^2(t)=\mathrm{alpha}^2(t)\mathrm{delta}^2$$

$$\mathrm{delta}_F^2(t-1)=\mathrm{alpha}^2(t-1)\mathrm{delta}_f^2(t-1)=\mathrm{alpha}^2(t-1)\mathrm{delta}^2$$

Applying the above results into Equation 4 to derive the weighting factor provides the following Equations 10 and 11:

$$w(t)=(\mathrm{alpha}(t)/\mathrm{alpha}(t-1))=(M(t)-C)/(M(t-1)-C) \qquad \text{Eq. 10}$$

or $$w(t) = (\mathrm{alpha}(t)/\mathrm{alpha}(t-1)) \qquad \text{Eq. 11}$$
$$= \mathrm{sqrt}(\mathrm{delta}_F^2(t)/\mathrm{delta}_F^2(t-1))$$

Since the solid color value C is generally unknown to the encoding engine, using the square root of variance provides a more accurate and robust estimation. After the weighting factor is derived, the additive offset factor may be determined by the following Equation 12:

$$o(t)=M(t)-w(t)M(t-1). \qquad \text{Eq. 12}$$

In general, after fade is detected and weighted prediction is selected, the weighted prediction parameters may be calculated for each pair between current picture and corresponding reference picture.

In general, statistics are generated through video analysis, and then are used to detect the existence of fade for the current picture. Each picture is then assigned a state value indicating whether the picture is in the state of NORMAL or in the state of FADE. Such state values are saved as records for each picture. Before encoding each picture, the state of the current picture and the state of each reference picture that is used to predict the current picture may be checked. When there is a FADE state in either the current picture or one of the corresponding reference pictures, weighted prediction may be used for the reference pair. Some statistics of the current picture and the respective reference picture may be processed to estimate the corresponding weighted prediction parameters. The weighted prediction parameters may be passed to the encoding engine to use in the encoding. Otherwise the normal encoding process may be performed.

In one example, the statistics generated during video analysis and used for fade detection may include, but are not limited to, (i) luma average value per picture (e.g., M(t) or luma_avg) and (ii) luma variance value per picture (e.g., $\mathrm{delta}_F^2(t)$ or luma_variance_avg). Both of the statistics are used to achieve simple yet efficient and robust fade detection. In one example, a first order derivative of the luma average values for each picture may be examined. The first order derivative of the luma average value may be represented by the following Equation 13:

$$\Delta M(t) = (\text{alpha}(t) - \text{alpha}(t-1))(m-C) \qquad \text{Eq. 13}$$

For a linear fading model where alpha(t)=t/T, ΔM(t) may be a constant value. For more general cases, Δ(t) generally has the same sign during the fade. For example, during fade out of the signal f into a black scene, (m−C) is always less than zero, while (alpha(t)−alpha(t−1)) is always less than zero, hence ΔM(t) is always less than zero. Because fade is a steady change between pictures, the second derivative of luma average values (e.g., AΔM(t)=ΔM(t)−ΔM(t−1)) are generally close to zero.

The ratio of the luma variance for two adjacent pictures may be represented by the following Eq. 14:

$$r(t) = \text{delta}_F^2(t)/\text{delta}_F^2(t-1) = \text{alpha}^2(t)/\text{alpha}^2(t-1) \qquad \text{Eq. 14}$$

For fade out of f, r(t) is always less than one, while for fade in of f, r(t) is always greater than one. To avoid false detection, real fading changes, that cause r(t) to range a small amount around one, may be taken into account.

To achieve simple yet efficient and robust detection, the following picture parameters may be defined from the two statistics luma_avg and luma_variance_avg, where the current picture is at time n:

1. Derivative of luma average: Delta_luma_avg(n)=luma_avg(n)−luma_avg(n−1);
2. 2nd Derivative of luma average: Delta2_luma_avg(n) =Delta_luma_avg(n)−Delta_luma_avg(n−1);
3. Ratio of luma variance: Ratio_luma_var(n)=luma_variance_avg(n)/luma_variance_avg(n−1).

Fading is generally a continuous behavior. Fading may be detected using a small window of frames. In the following example, statistics of M frames are used. M equal to 1 means only the current picture statistics are used. This implies the delay of M−1 frames between the video analysis and the real encoding. With a hierarchical B picture GOP (Group of Pictures) structure of IbBbP, where B is a reference bi-directional picture, and b is a non-reference bi-directional picture, M may be set as 4 without introducing further delay.

Fading effects may result from lighting changes, which may be reflected in both the luma average values and the luma variance values. To make the detection robust to different kinds of conditions, criteria may be defined using both the above statistics to detect the fade. When all of the following criteria are met, a fade is detected:

1. Detect a luminance level change (e.g., picture getting brighter or darker) among the past M frames (e.g., Delta_luma_avg(n), Delta_luma_avg (n−1), . . . , Delta_luma_avg(n−M+1) have the same sign).
2. Detect a steady change between pictures. For example, abs(Delta2_luma_avg(n)), abs(Delta2_luma_avg(n−1)), . . . , abs(Delta2_luma_avg(n−M+2)) are within a predefined threshold (e.g., MAX_DELTA_DELTA_DC). In one example, the threshold MAX_DELTA_DELTA_DC may have a default value of 10).
3. Detect a consistent change (e.g., continuously larger than 1 or less than 1) among the past M frames (e.g., (Ratio_luma_var(n)−1), (Ratio_luma_var(n−1)−1), . . . , (Ratio_luma_var(n−M+1)−1) have the same sign).
4. Detect changes in the ratio of variances. For example, all Ratio_luma_var(n), Ratio_luma_var(n−1), . . . , Ratio_luma_var(n−M+1) are less than a first predefined threshold (e.g., FADE_MIN_VAR_RATIO) or greater than a second predefined threshold (e.g., FADE_MAX_VAR_RATIO). The predefined threshold FADE_MIN_VAR_RATIO may have a default value of, in one example, 0.96. The second predefined threshold FADE_MAX_VAR_RATIO may have a default value of, in one example, 1.05. In one example, the fourth criterion may be checked only when the previous frame n−1 is in the NORMAL state. When the state of the previous frame n−1 is already in FADE, the fourth criterion is generally not checked to avoid too easily forcing a transition back to NORMAL.

When all of the above criteria are satisfied, the states of frame n, n−1, . . . , n−M+1 are all set as FADE. In general, the fading is a continuous behavior, so the states of all the frames in the M frame window are set at the same time.

In general, the delay occurs during fade detection. A frame may transition from the state NORMAL to the state FADE, however, once a frame is in the FADE state, the frame remains in the FADE state (e.g., transition from the state of FADE to the state of NORMAL is generally not allowed for the same frame). For example, when frames 0-3 are analyzed and the above criteria are not satisfied, the states of frames 0-3 may be set as NORMAL. However, when frames 1-4 are analyzed, and the above criteria are satisfied, the states of frame 1-4 are all set as FADE, reflecting the entering into FADE from frame 1. When frames 2-5 are analyzed, and the above criteria are not satisfied, the state of frame 5 is set as NORMAL, but frames 2-4 remain in the FADE state, reflecting the leaving of the FADE states in frame 4.

Figure 2:
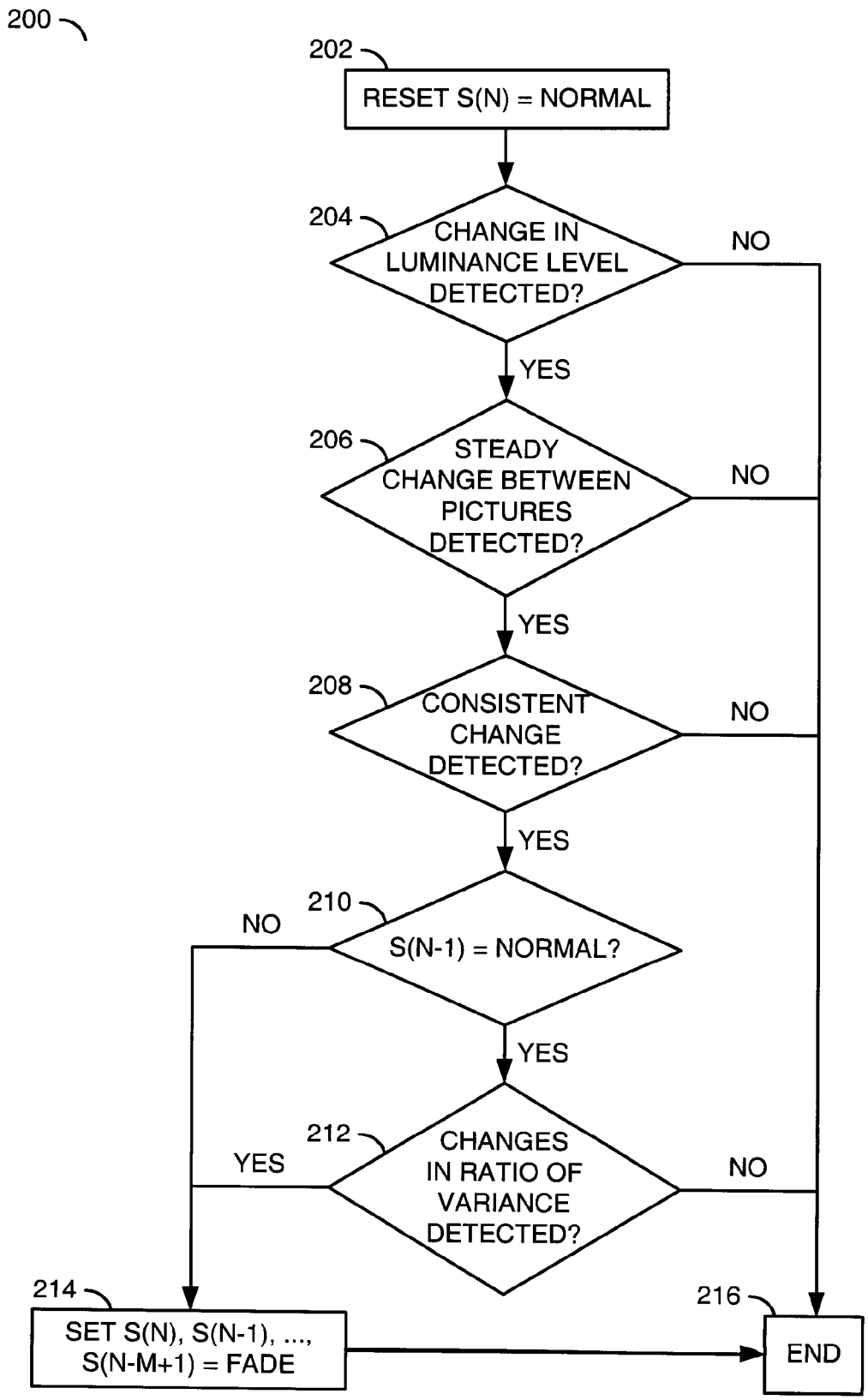
FIG. 2 is a block diagram illustrating a state setting procedure in accordance with the present invention.

Referring to FIG. 2, a diagram is shown illustrating a state setting procedure 200 in accordance with an embodiment of the present invention. The process 200 may comprise a stage (or process) 202, a stage (or process) 204, a stage (or process) 208, a stage (or process) 210, a stage (or process) 212, a stage (or process) 214 and a stage (or process) 216. The stage 202 may comprise a picture state reset stage. The stages 204, 206, 208, 210 and 212 may comprise decision states. The stage 214 may comprise a picture state setting stage. The stage 216 may comprise an end state.

The process 200 generally starts in the stage 202. In the stage 202, the state of a frame N is reset to a value of NORMAL. When the state of the frame N has been reset, the process 200 moves to the stage 204. In the stage 204, the process 200 determines whether a luminance level change occurred among the past N frames. When no change in luminance levels is detected, the process 200 may move to the stage 216 and end. When change in the luminance level is detected, the process 200 may move to the stage 206.

In the stage 206, the process 200 determines whether a steady change between pictures is detected. When a steady change between pictures is not detected, the process 200 may move to the stage 216 and end. When a steady change between pictures is detected, the process 200 may move to the stage 208.

In the stage 208, the process 200 determines whether a consistent change among the past N frames is detected. When a consistent change among the past N frames is not detected, the process 200 may move to the stage 216 and end. When a consistent change among the past N frames is detected, the process 200 may move to the stage 210.

In the stage 210, the process 200 determines whether the frame N−1 has a state with a value NORMAL. When the state of the frame N−1 is not NORMAL, the process 200 may move to a stage 216 and end. Otherwise, the process 200 moves to the stage 212.

In the stage 212, the process 200 determines whether or not changes in the ratio of variances is detected. When no changes are detected, the process 200 generally moves to the stage 216 and terminates. Otherwise, the process 200 may move to the stage 214. In the stage 214, the process 200 generally sets the state for the current frame N and the previous M frames to the value FADE. When the state for the current frame and the previous M frames have been changed to the value FADE, the process 200 may move to the state 216 and terminate.

After fade detection, the decision of whether to use weighted prediction or not may be made, and if used, the weighted prediction parameters calculated. When there is a FADE state in any of the reference pictures or the current picture, the weighted prediction may be used. For each reference picture in the prediction list table, if the state of the reference picture or the state of the current picture is FADE, the weighted prediction parameters for the respective pair are calculated. The present invention generally provides a mathematically accurate estimation process. The present invention generally uses the square root of the ratio of the variance to calculate the weighting factor, and then calculates the offset based on the weighting factor. The use of the square root of the variance ratio is mathematically accurate for estimating the weighting factor.

Figure 3:
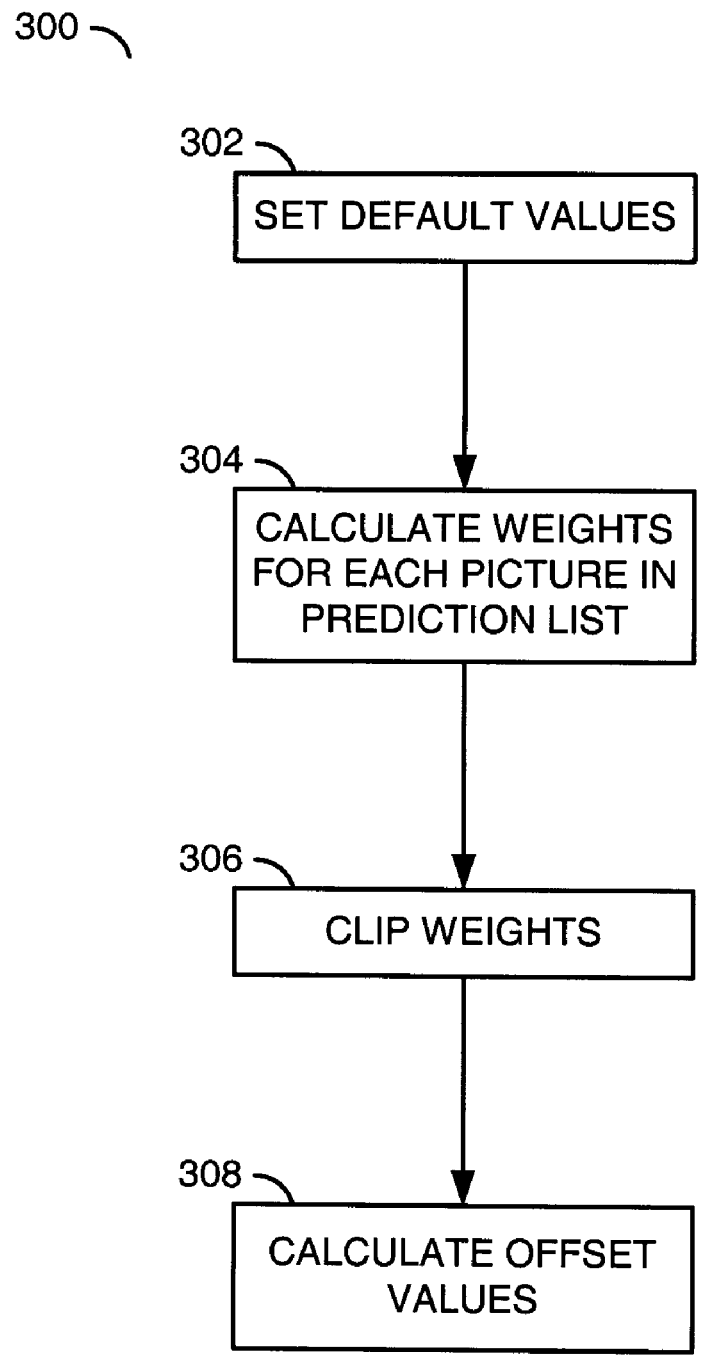
FIG. 3 is a flow diagram illustrating a weighted parameters estimation process in accordance with the present invention.

Referring to FIG. 3, a flow diagram is shown illustrating a process 300 to apply weighted prediction parameter estimation in accordance with a preferred embodiment of the present invention. The process 300 may comprise a stage (or process) 302, a stage (or process) 304, a stage (or process) 306 and a stage (or process) 308. The stage 302 may comprise a default setting process. The stage 304 comprise a weight calculation process. The stage 306 may comprise a clipping process. The stage 308 may comprise an offset calculation process.

The process 300 may begin in the stage 302. In the stage 302, default values may be set (e.g., luma_log_weight_denom=5; default_weight=1<<luma_log_weight_denom; etc.). When the default values have been set, the process 300 may move to the stage 304. In the stage 304, weights may be calculated for each reference picture in the prediction list for a current picture. In one example, the weights for each reference picture may be calculated using the variance of the current picture (e.g., var_curr=luma_variance_avg(n)) and the variance of the respective reference picture (e.g., (var_ref=luma_variance_avg of reference picture): weight [list_idx][ref_idx]=(default_weight*sqrt(var_curr/var_ref [list_idx][ref_idx])).

When the weights have been calculated, the weights may be clipped. In one example, the weights may be clipped based upon a type of slice to which the weight corresponds. For example, clipping may be performed according to the following equations: for a P-slice, weight[list_idx][ref_idx]=Clip3(-128,127,weight[list_idx][ref_idx]);

for a B-slice, weight[list_idx][ref_idx]=Clip3(-64,63,weight[list_idx][ref_idx]);

where the function Clip3(a,b,c) may be defined, in one example, as follows:

if $(c)<(a)$, Clip3$(a,b,c)=(a)$;

if $(c)>(b)$, Clip3$(a,b,c)=(b)$;

otherwise, Clip3$(a,b,c)=(c)$.

When the weighting factors have been clipped, the process 300 may move to the stage 308. In the stage 308, additive offset values may be calculated using, for example, the luma average of (i) the current picture (e.g., dc_curr=luma_avg(n)) and (ii) the reference picture (e.g., dc_ref=luma_avg of reference picture). In one example, the additive offset values may be calculated using a process similar to the following:

offset[list_idx][ref_idx]=dc_curr−(weight[list_idx]
[ref_idx]>>1 um a_log_weight_denom)*dc_ref
[list_idx][ref_idx]; offset[list_idx][ref_idx]
=Clip3(−128,128,offset[list_idx][ref_idx]).

The present invention generally provides both a method for mathematically accurate parameter estimation and an efficient method for fade detection with exploration of the video statistics in a very small time period. Both tasks may be accomplished with low delay or no delay. Both tasks may employ simple calculations and low storage. The methods in accordance with the present invention may provide 10%-40% bit rate reductions for typical fading scenes. Ergodic, as used herein, is a term in probability/statistics generally referring to a time average behavior of a random variable converges to the statistical mean of the variable.

While the invention has been particularly shown and described with reference to the preferred embodiments thereof, it will be understood by those skilled in the art that various changes in form and details may be made without departing from the spirit and scope of the invention.

What is claimed is:

1. A method to control weighted prediction for video compression comprising:
    generating statistics based upon analysis of at least one of a plurality of characteristics of a plurality of video frames, the plurality of characteristics comprising luminance, chrominance, spatial and temporal characteristics of the plurality of video frames;
    detecting a fade condition based upon said statistics that are associated with the at least one of the plurality of characteristics, the fade condition being based on a regular change of said statistics among the plurality of video frames;
    generating one or more estimated weighted prediction parameters based upon said statistics when said fade condition is detected;
    encoding said plurality of video frames, wherein said encoding takes into account said estimated weighted prediction parameters when generated; and
    wherein the statistics associated with the at least one of a plurality of characteristics comprises an average value per picture, a variance value per picture, a derivative of the average value per picture, and a ratio of the variance value per picture for a current picture and each associated reference picture.

2. The method according to claim 1, wherein said one or more estimated weighted prediction parameters comprise a weighting factor and an additive offset.

3. The method according to claim 1, wherein detecting said fade condition comprises:
    detecting a change in luminance level;
    detecting a steady change between pictures;
    detecting a consistent change among said pictures; and
    detecting changes in a ratio of variance.

4. The method according to claim 1, wherein generating said one or more estimated weighted prediction parameters comprises:
    calculating weights for each picture in a prediction list;
    clipping the weights; and
    calculating offset values.

5. The method according to claim 4, wherein said weights are calculated from a square root of a ratio of variances of a current picture and a corresponding reference picture.

6. The method according to claim 4, wherein said offset values are calculated based upon said weights and average luminance statistics of a current picture and a corresponding reference picture.

7. The method according to claim 4, wherein clipping the weights comprises:
    comparing each of said weights with a first predetermined threshold value and a second predetermined threshold value;
    setting each of said weights that is less than said first predetermined threshold value to said first predetermined threshold value; and
    setting each of said weights that is greater than said second predetermined threshold value to said second predetermined threshold value.

8. The method according to claim 1, wherein the statistics generated comprise an average luminance value per picture and a luminance variance value per picture.

9. The method according to claim 8, further comprising generating a first derivative of the average luminance value per picture statistic, a second derivative of the average luminance value per picture statistic and a ratio of the luminance variance value per picture statistic for a current picture and each associated reference picture.

10. An apparatus comprising:
    means for generating statistics based upon analysis of at least one of a plurality of characteristics of a plurality of video frames, the plurality of characteristics comprising luminance, chrominance, spatial and temporal characteristics of the plurality of video frames;
    means for detecting a fade condition based upon said statistics that are associated with the at least one of the plurality of characteristics, the fade condition being based on a regular change of said statistics among the plurality of video frames;
    means for generating one or more estimated weighted prediction parameters based upon said statistics when said fade condition is detected; and
    means for encoding said plurality of video frames, wherein said encoding takes into account said estimated weighted prediction parameters when generated; and
    wherein the statistics associated with the at least one of a plurality of characteristics comprises an average value per picture, a variance value per picture, a derivative of the average value per picture, and a ratio of the variance value per picture for a current picture and each associated reference picture.

11. An apparatus comprising:
    a video analyzer circuit configured to generate one or more statistics based upon an analysis of at least one of a plurality of characteristics of a plurality of video frames, the plurality of characteristics comprising luminance, chrominance, spatial and temporal characteristics of the plurality of video frames;
    a detector circuit configured to detect a fade condition based upon said one or more statistics that are associated with the at least one of the plurality of characteristics, the fade condition being based on a regular change of said statistics among the plurality of video frames;
    an estimator circuit configured to generate one or more weighted prediction parameters in response to said one or more statistics and a state of said plurality of video frames;
    an encoder configured to encode said plurality of video frames using said one or more weighted prediction parameters when generated; and
    wherein the statistics associated with the at least one of a plurality of characteristics comprises an average value per picture, a variance value per picture, a derivative of the average value per picture, and a ratio of the variance value per picture for a current picture and each associated reference picture.

12. The apparatus according to claim 11, wherein said one or more weighted prediction parameters comprise a weighting factor and an additive offset.

13. The apparatus according to claim 11, wherein said detector circuit is further configured to:
    detect a change in luminance level;
    detect a steady change between pictures;
    detect a consistent change among said pictures; and
    detect changes in a ratio of variance.

14. The apparatus according to claim 11, wherein said detector circuit is further configured to:
    set a state of a current video frame to a first value in response to detecting all of a change in luminance level, a steady change between pictures, a consistent change among said pictures and changes in a ratio of variance; and
    set said state of said current video frame to a second value in response to a lack of detection of any one of a change in luminance level, a steady change between pictures, a consistent change among said pictures and changes in a ratio of variance.

15. The apparatus according to claim 11, wherein generating said one or more weighted prediction parameters comprises:
    calculating weights for each picture in a prediction list;
    clipping the weights; and
    calculating offset values.

16. The apparatus according to claim 15, wherein said weights are calculated from a square root of a ratio of variances of a current picture and a corresponding reference picture.

17. The apparatus according to claim 15, wherein clipping the weights comprises:
    comparing each of said weights with a first predetermined threshold value and a second predetermined threshold value;
    setting each of said weights that is less than the first predetermined threshold value to said first predetermined threshold value; and
    setting each of said weights that is greater than said second predetermined threshold value to said second predetermined threshold value.

18. The apparatus according to claim 15, wherein said offset values are calculated based upon said weights and average luminance statistics of a current picture and a corresponding reference picture.

19. The apparatus according to claim 11, wherein the statistics comprise an average luminance value per picture and a luminance variance value per picture.

20. The apparatus according to claim 19, wherein the video analyzer circuit is further configured to generate a first derivative of the average luminance value per picture statistic, a second derivative of the average luminance value per picture statistic and a ratio of the luminance variance value per picture statistic for a current picture and each associated reference picture.

* * * * *